(12) United States Patent
Reynolds, Jr.

(10) Patent No.: US 7,497,481 B2
(45) Date of Patent: Mar. 3, 2009

(54) TREATING METHOD AND DESIGN METHOD FOR TUBULAR CONNECTIONS

(75) Inventor: Harris A. Reynolds, Jr., Houston, TX (US)

(73) Assignee: Hydril LLC, Houston, TX (US)

( * ) Notice: Subject to any disclaimer, the term of this patent is extended or adjusted under 35 U.S.C. 154(b) by 236 days.

(21) Appl. No.: 11/129,214

(22) Filed: May 13, 2005

(65) Prior Publication Data
US 2006/0255591 A1    Nov. 16, 2006

(51) Int. Cl.
*F16L 25/00* (2006.01)
(52) U.S. Cl. ....................................... 285/333
(58) Field of Classification Search ............... 285/333, 285/334
See application file for complete search history.

(56) References Cited

U.S. PATENT DOCUMENTS

| | | | |
|---|---|---|---|
| 2,145,168 A | 1/1939 | Flagg | |
| 2,543,741 A | 2/1951 | Zweifel | |
| 2,754,266 A | 7/1956 | Stegemeier et al. | |
| 2,893,759 A | 7/1959 | Blose | |
| 3,116,178 A | 12/1963 | Upham | |
| 3,423,315 A | 1/1969 | McCarthy et al. | |
| 3,935,114 A | 1/1976 | Donaho, Jr. | |
| 4,330,345 A * | 5/1982 | Miles et al. | 148/262 |
| 4,510,209 A | 4/1985 | Hada et al. | |
| 4,544,639 A | 10/1985 | Faust | |
| 4,813,714 A * | 3/1989 | Fairey et al. | 285/94 |
| 5,234,509 A * | 8/1993 | Tull | 148/246 |
| 5,423,579 A | 6/1995 | Blose et al. | |
| 5,900,073 A * | 5/1999 | Sienkowski et al. | 148/247 |
| 6,179,934 B1 | 1/2001 | Kawakami et al. | |
| 6,612,415 B2 | 9/2003 | Yamane | |
| 6,679,526 B2 * | 1/2004 | Yamamoto et al. | 285/55 |
| 6,729,658 B2 * | 5/2004 | Verdillon | 285/333 |
| 6,746,057 B2 * | 6/2004 | Goto et al. | 285/333 |
| 6,827,996 B2 | 12/2004 | Goto | |
| 6,869,111 B2 * | 3/2005 | Goto et al. | 285/333 |
| 6,933,264 B2 * | 8/2005 | Petelot | 508/318 |
| 6,957,834 B2 * | 10/2005 | Maeda | 285/333 |
| 6,971,681 B2 * | 12/2005 | Dell'Erba et al. | 285/55 |
| 2003/0144158 A1 | 7/2003 | Petelot | |
| 2003/0159764 A1 | 8/2003 | Goto | |
| 2004/0113423 A1 | 6/2004 | Dell'Erba et al. | |

OTHER PUBLICATIONS

International Search Report mailed Sep. 15, 2006 and issued in International Patent Application No. PCT/US2006/017814 (4 pages).

* cited by examiner

*Primary Examiner*—David E Bochna
(74) *Attorney, Agent, or Firm*—Osha Liang LLP

(57) ABSTRACT

A method of treating a threaded connection that includes determining a treating time sufficient to form a thickness of a hopeite coating, coating at least a portion of the threaded connection with phosphating compound for a period of time sufficient to form the thickness of the hopeite coating is described.

7 Claims, 2 Drawing Sheets

TREATING METHOD AND DESIGN METHOD FOR TUBULAR CONNECTIONS

BACKGROUND OF INVENTION

1. Field of the Invention

The invention relates generally to surface treatment of threaded connections for oil and gas well casing and tubing with metal-to-metal seals. More particularly, the invention relates to setting a ratio of phosphophyllite ($Zn_2Fe(PO_4)_2 \cdot 4H_2O$) and hopeite ($Zn_3(PO_4)_2 \cdot 4H_2O$) in a zinc phosphate treatment of a threaded connection to provide improved resistance to galling.

2. Background Art

Casing joints, liners, and other oilfield tubulars are often used in drilling, completing, and producing a well. Casing joints, for example, may be emplaced in a wellbore to stabilize a formation or to protect a formation against elevated wellbore pressures (e.g., wellbore pressures that exceed a formation pressure).

Casing joints may be coupled in an end-to-end manner by threaded connections designed so as to form a seal between an interior of the coupled casing joints and an annular space formed between exterior walls of the casing joints and walls of the wellbore. The seal may be a metal-to-metal seal formed proximate the connection. Examples of such metal-to-metal seals are taught in U.S. Pat. No. 5,423,579 issued to Blose, et al. and Pat. No. 2,893,759 issued to Blose, both of which are assigned to the assignee of the present invention.

Metal-to-metal seals used in threaded connections for relatively thin-walled oilfield tubulars may have shallow seal angles of less than 10 degrees, measured from the centerline of the threaded connection, in order to use the thin walls of the pipe most effectively.

Large diameter oilfield tubulars, because of their relatively high D/t ratio (the ratio of the nominal outer diameter of the pipe to the nominal wall thickness of the pipe) can suffer from ovality or other eccentricities due to manufacturing variables or damage from improper handling. When metal-to-metal seals are used on threaded connections for large diameter casing, the thread designer is often obligated to increase the interference between the seal surfaces at make-up (that is, when the connection is screwed together) to ensure that any eccentricity of the pipe does not compromise the seal. Seal interference is typically measured in thousandths of an inch of diametral interference per inch of nominal pipe diameter. Seal interferences may fall within the range of 0.0025" to 0.0045" per inch of nominal pipe diameter. For example, a metal-to-metal seal on 16" nominal diameter pipe may have an interference at make-up of 0.040" to 0.072" on diameter.

As used herein, large diameter oilfield tubulars generally means pipes having a nominal diameter of greater than or equal to 9.375", although the benefits of the current invention are not necessarily limited to pipes of this dimension.

Furthermore, it is now commonly required by companies which drill oil and gas wells that the threaded connections on large diameter casing be capable of multiple make-and-break cycles, that is, the connections must be made-up (screwed together) and broken-out (screwed apart) multiple times without deleterious effects such as galling of the metal-to-metal seal surfaces.

Galling is a well known phenomenon to those having ordinary skill in the art. Galling may be thought of as a deleterious loss of lubrication. Galling is often caused by high contract stresses over long surfaces. Therefore, galling is particularly significant for oilfield tubulars having shallow contact angles (shallow contact angles, of course, lead to long contact stresses). Further, it is also common in large diameter tubulars, because of the higher contact stress associated with the larger diameters.

The requirement of being able to make up the connections numerous times is intended to ensure that if a problem is encountered while running the casing into the well, such as an obstruction in the well bore, that the casing can be removed from the well bore while the problem is rectified, and the casing can then be re-installed. A common version of this make-and-break requirement is that the threaded connection must be capable of being made-up three times and broken-out twice, which simulates two problem runs followed by a completed run of casing into the wellbore.

When threaded connections for oilfield connections are made-up, conventionally they are lubricated by "thread compound", commonly called "pipe dope". Thread compound is most commonly a grease-based compound with entrained particles of lead, copper, or tin, or graphite or their oxides or sulfides, or similar inorganic materials, or alternatively PTFE or other synthetic materials. These particles typically may range in size from 1 micron to about 75 microns, but may sometimes be greater than 100 microns in size.

U.S. Pat. No. 2,543,741 (Zweifel) for example, teaches a lubricating composition for threaded joints which contains flake copper, powdered lead, and graphite. The copper flakes in the composition are very small, and ordinarily will be of substantially uniform thickness, within the range of $3.9 \times 10^{-5}$ to $19.5 \times 10^{-5}$ inches (or about 1 micron to 5 microns). It is taught that the copper flake should not exceed, in its greatest dimensions, about 76 microns.

U.S. Pat. No. 2,754,266 (Stegemeier, et al.) teaches an electrically conductive thread compound containing fine particles of metals, metal oxides, or metal sulfides, with a maximum particle size of less than about 0.002" (about 50.8 microns), and preferably less than 0.001" (about 25.4 microns).

U.S. Pat. No. 3,423,315 (McCarthy, et al.) teaches a pipe thread lubricant containing powdered lead particles where about 63 percent of the lead particles will pass a 325 mesh sieve (that is, are less than 44 microns in size) and where another 14 percent of the lead particles will pass a 200 mesh sieve (that is, are less than 74 microns in size).

U.S. Pat. No. 3,935,114 (Donaho) teaches a low-wear grease for journal bearings on oilfield drilling bits which contains molybdenum disulfide having a range of particle sizes, including some fine and some coarse particles, with 100 percent of the particles passing though a 100 mesh sieve (that is, are less than 149 microns), and 85 percent of the particles passing through a 325 mesh sieve (that is, are less than 44 microns).

When threaded connections on large-diameter casing have shallow-angle metal-to-metal seals (that is, seals with seal angles less than 10 degrees) used in combination with high seal interferences, the metal-to-metal seal surfaces may be in contact for several rotations of the connections during make-up.

Furthermore, if the thread pitch (conventionally denominated as threads per inch) is high, the metal-to-metal seal surfaces may be in contact for more rotations of the connections during make-up than if the thread pitch is lower. Thread pitch for threaded connections for oilfield tubulars are typically in the range of 2 threads per inch to 6 threads per inch.

Overall, this combination of variables can yield a situation in which the two steel surfaces of the metal-to-metal seals are in sliding contact, under stresses normal to the contact surfaces, for a considerable helical distance. This can mean that under these conditions, the metal-to-metal seal surfaces are highly prone to galling on repeated make-break cycles.

Conventionally, phosphate coatings may be applied to threaded connections on oilfield tubulars to reduce corrosion during storage and to improve the retention of the thread lubricant ("pipe dope") during make-up. Various types of phosphate coatings are used for this purpose. For example, drill pipe threads, which can see hundreds of make-and-break cycles during their life-time, are commonly coated with a heavy manganese phosphate treatment. Manganese phosphate coatings are typically thicker, harder, have better thermal stability, and resist burnishing better than zinc phosphate coatings.

However, manganese phosphate treatments can be much more expensive and time-consuming to apply than zinc phosphate treatments.

Zinc phosphate coatings have been widely used industrially as an undercoating for paint in order to improve the adhesion of the paint and to improve corrosion resistance. Zinc phosphate coatings on a steel substrate are typically composed of two hydrated minerals: hopeite (zinc phosphate, $Zn_3(PO_4)_2 \cdot 4H_2O$), and phosphophyllite (zinc iron phosphate, $Zn_2Fe(PO_4)_2 \cdot 4H_2O$). Hopeite crystals are generally orthorhombic in form, with a Moh's hardness of about 4. Phosphophyllite crystals are generally monoclinic in form, with a Moh's hardness of about 3.

It is known that (a) the weight of the phosphate coating, typically measured in grams per square meter ($gm/m^2$), and (b) the proportions of phosphophyllite and hopeite in the coatings, have a profound effect on the adhesion of subsequent coatings (such as paint), and on corrosion resistance, and that these are important characteristics that determine the efficiency of a phosphate coating.

The proportions of phosphophyllite and hopeite in a zinc phosphate coating are often expressed as ratio called the "Phosphophyllite Ratio", or "P-Ratio", which is expressed as:

$$P\text{-Ratio}=lp/lp+lh \quad \text{(Eq. 1)}$$

where lh represents the X-Ray diffraction intensity from the surface of hopeite and lp represents the X-Ray diffraction intensity from the surface of phosphophyllite. The P-Ratio is widely recognized as a characterizing value for the zinc phosphate-type films used as paint-base coatings on iron and steel Traditionally, the iron required to form phosphophyllite in a zinc phosphating system is obtained by dissolution of a steel substrate. In some modern zinc phosphating systems, available iron may also be added to the phosphating solution. In the case of "tri-cation" phosphating systems, nickel and manganese may also be added to the phosphating bath.

For the purposes of measuring the P-Ratio with reference to the present invention, it is assumed, as is the current practice in the art, that "phosphophyllite" in the P-Ratio encompasses not only zinc iron phosphate, but also any of its analogues in which manganese, nickel, cobalt, calcium, magnesium, copper, and/or similar cations that were dissolved in the phosphating solution can replace some or all of the iron in the phosphophyllite.

The standard method for determining the P-ratio is by X-ray diffraction; however, it can also be determined experimentally by a number of methods, including, for example, a reagent method taught in U.S. Pat. No. 4,544,639 (Faust).

When a zinc phosphate coating is used as an undercoat on steel for a painted surface (for example, in automotive or appliance applications), it is well-known in the art that the resistance of the painted surface to salt-spray and scab corrosion is greatly improved by maintaining a very high P-Ratio in the zinc phosphate undercoat. That is, it is desirable to reduce the percentage of hopeite in the zinc phosphate coating used for paint undercoating.

As taught in U.S. Pat. No. 6,179,934 (Kawakami, et al.), Col. 2, Line 41, P-Ratio values of 0.8 to 1.0 are considered to provide good conversion coatings for paint-based coatings.

U.S. Pat. No. 6,612,415 (Yamane) discloses that the most preferable P-Ratio for phosphate coating of a steel disc-brake shoe to effect good bonding between the backing plate and the friction material is 0.8 to 1.0.

U.S. Pat. No. 4,510,209 (Hada, et al.) teaches a two layer-coated steel material with a base coat of zinc or zinc-based alloy (essentially galvanized steel), and a surface coating layer of zinc phosphate, to improve the performance of later over coatings such as paint. The '209 patent further teaches that when a conventional zinc phosphate treatment is applied to zinc or zinc-based alloy-plated steel material, the resultant phosphate coating film mainly comprises a hopeite-type zinc phosphate ($Zn_3(PO_4)_2 \cdot 4H_2O$) in the form of needle-like crystals.

It is known in the art that a zinc phosphate treatment applied to pure zinc will yield 100% Hopeite in the absence of any free iron in the solution. As will be discussed later, a higher Hopeite percentage in a zinc phosphate coating on a threaded connection for oilfield tubulars would be highly desirable, but the added expense of the required zinc base coat required by the process taught by the '209 patent makes it uneconomical for oilfield threaded connections.

Nevertheless, as shown in FIG. 1 (FIG. 3 of the '209 patent), the '209 patent teaches that there are three distinct "zones" of crystal formation in zinc phosphate coatings on galvanized steel, depending on the concentration of zinc in the coating, as follows: (a) When the content of zinc is between 2% and 40% by weight, the resulting phosphate layer consists mainly of zinc iron phosphate, or phosphophyllite, in the form of fine particle-shaped dense crystals. As shown in FIG. 1, Curve II, this zone is labeled "Grain Shaped Crystals". (b) When the content of zinc is in the range from about 40% to about 60% by weight, the phosphate film layer consists of a mixture of the fine particle-shaped phosphophyllite crystals and coarse needle-shaped hopeite crystals. As shown in FIG. 1, Curve II, this zone is labeled "Mixture of Needle-Shaped Crystals and Grain Shaped Crystals." (c) When the content of zinc exceeds about 60% by weight, the phosphate layer consists mainly of the hopeite crystals. As shown in FIG. 1, Curve II, this zone is labeled "Needle-Shaped Crystals." This chart demonstrates clearly the continuum of the effect on the crystal morphology (including both crystal size and shape) of a zinc phosphate coating as the ratio of zinc to iron in the coating changes.

In general, hopeite crystals tend to grow much larger (reportedly up to 20-50 microns in length) than phosphophyllite crystals, and in random orientations, including some crystals growing vertically, or normal to the plane of the substrate. The random pattern of hopeite crystal growth results in relatively large interstices between the crystals. The combination of relatively large crystal size, random (and sometimes vertical) crystal growth, and large interstices has been shown to adversely affect the adhesion of overcoats (such as paints) to a hopeite-rich zinc phosphate layer.

What is still needed, however, are methods for improving the performance of a zinc phosphate coating to meet a requirement for multiple make-and-break cycles rather than to use a manganese phosphate system, or other expensive phosphating system, for threaded connections on oilfield casing.

SUMMARY OF INVENTION

In one aspect, the present invention relates to a method of designing a threaded connection for oilfield tubulars of a particular nominal diameter and wall thickness, having a metal-to-metal seal and a zinc phosphate coating, including the steps of determining a desired thread pitch, determining a desired metal-to-metal seal angle, determining a desired diametral interference between the metal-to-metal seal surfaces at a prescribed make-up of the threaded connection, and selecting the appropriate P-Ratio for the zinc phosphate coating to prevent galling during a prescribed number of make-and-break cycles.

In another aspect, the present invention relates to a threaded connection for oilfield tubulars having a metal-to-metal seal and a zinc phosphate coating, including a zinc phosphate coating with a P-Ratio less than or equal to 0.8.

In yet another aspect the present invention relates to a method of treating a threaded connection, including the steps of determining a treating time sufficient to form a thickness of a hopeite coating and coating at least a portion of the threaded connection with a phosphating compound for a period of time sufficient to form the thickness of the hopeite coating.

Other aspects and advantages of the invention will be apparent from the following description and the appended claims.

DETAILED DESCRIPTION

In one aspect, embodiments of the invention relate to a method of designing a threaded connection having a metal-to-metal seal and a zinc phosphate coating. In particular, embodiments relate to a method of treating a threaded connection. Moreover, embodiments relate to threaded connections having a metal-to-metal seal and a zinc phosphate coating.

Figure 2:
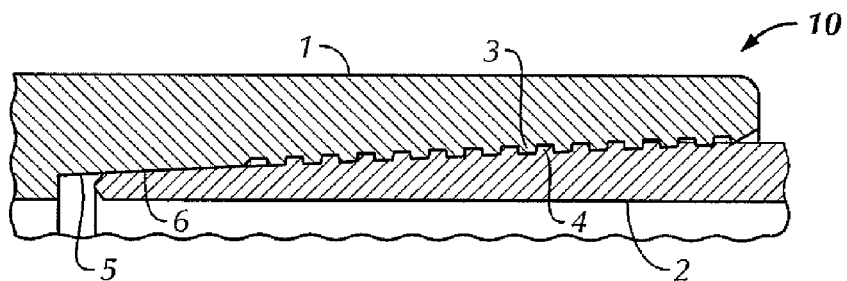
FIG. 2 is a threaded connection for oilfield tubulars with a metal-to-metal seal, as taught is U.S. Pat. No. 2,893,759.

Referring to FIG. 2, a threaded connection for oilfield tubulars with a metal-to-metal seal is shown. The threaded connection a cylindrical female or box member 1 coupled with a cylindrical male or pin member 2. The box member 1 and pin member 2 may be integral with the ends of adjacent casings members (not shown separately) and designed to couple the adjacent casings together. The box member 1 and pin member 2 may include complementary internal and external threaded portions 3 and 4, respectively. The box member 1 includes a conical sealing surface 5 which is substantially complementary to a corresponding sealing surface 6 of the pin member 2.

In one embodiment of the invention, a zinc phosphate coating is provided to a threaded connection, such as the threaded connection shown in FIG. 2. The zinc phosphate coating may include both hopeite and phosphyllite. The zinc phosphate coating may be applied to either the box member 1 or the pin member 2. Alternatively, the zinc phosphate coating may be applied to the box member 1 and the pin member 2.

According to one embodiment of the present invention, the amount of hopeite and phosphyllite is determined by selecting a suitable P-Ratio. High P-Ratio coatings (with a low percentage of Hopeite) can be produced by several different methods well-known in the art, including but not limited to:

Using a quiescent phosphating bath

Using a low zinc concentration in the phosphating solution

Using short residence times in the phosphating bath

By contrast, the percentage of Hopeite in the coating may be increased, and the P-ratio lowered, by several different methods, including but not limited to:

Applying a zinc phosphate coating on galvanized steel

Using a high zinc concentration in the phosphating solution

Increasing the residence time in a quiescent phosphating bath

Agitating a quiescent phosphating bath.

Using spray application instead of a bath

Brushing or rubbing the surface during processing.

In one embodiment of the present invention, the P-Ratio may be less than or equal to 0.8. In another embodiment, the P-Ratio may be less than or equal to 0.6. In yet another embodiment, the P-Ratio may be less than or equal to 0.4.

It has been determined through experimentation that galling of metal-to-metal seal surfaces on large diameter casing during repeated make-and-break cycles may be significantly reduced or eliminated with a modified zinc phosphate coating applied to either the pin (male) threaded connection or the box (female) threaded connection, or both.

Specifically, it has been determined that contrary to the teachings of the prior art concerning the optimum zinc phosphate coating for painted or bonded surfaces, that there is a maximum P-Ratio required to prevent galling of a metal-to-metal seal on a particular threaded connection for oilfield tubulars. The maximum P-Ratio of a zinc phosphate coating for a given threaded connection may be determined according to:

$$P_{max} \approx C_1 D + C_2 T + C_3 A + C_4 I \qquad \text{(Eq. 2)}$$

wherein D is the diameter of the nominal OD of the pipe (the diameter of the contact area of the seal); T is the thread pitch, A is the seal angle, I is the seal interference, and $P_{max}$ is the maximum P-Ratio. $C_1$, $C_2$, and $C_4$ are inverse functions and $C_3$ is a direct function, such that when the diameter, thread pitch or seal interference increase, $P_{max}$ decreases, and when the seal angle increases, $P_{max}$ increases. It is also contemplated that the maximum P-Ratio may also be affected by additional variables, such as the interstices of the hopeite crystals.

Furthermore, it has been determined experimentally that while the phosphate coating thickness may not increase with dip times longer than about 600 seconds in a conventional commercial zinc phosphate bath, the galling resistance may improve with longer dip times, ranging from at least 600 seconds to at least 1600 seconds.

Figure 3:
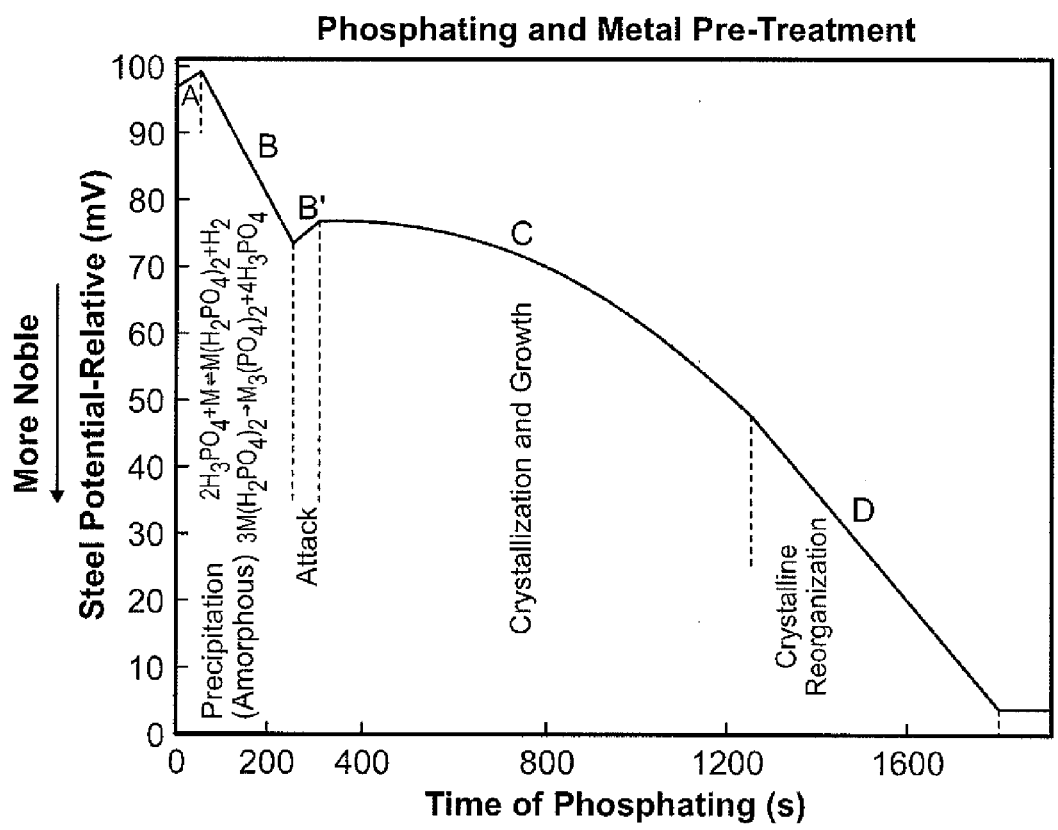
FIG. 3 is a prior art chart of showing electronegativity across a phosphate coating versus dip time. From Phophating and Metal Pre-Treatment (D. B. Freeman), Industrial Press, Inc., 1986. ISBN 0-8311-1168-2.

This finding is in general agreement with the events shown in FIG. 3, which displays the electric potential (in millivolts, or mV) across a zinc phosphate coating, versus the residence time in a zinc phosphate coating bath. Typical residence times of threaded connections on oilfield tubulars in conventional zinc phosphate baths are on the order of several minutes, generally well below 10 minutes (or 600 seconds). This corresponds to the beginning of the "crystallization and growth" phase of the process, which in turn corresponds to a very high P-Ratio, and the crystals formed during this phase are predominately phosphophyllite.

In order to achieve a zinc phosphate coating which will limit galling on metal-to-metal seals on a threaded connection for oilfield tubulars, experimentation has proven that the P-Ratio of the coating must correspond to the middle or later stages of the "C" Zone in FIG. 3 ("Crystallization and Growth"), or into the "D" zone ("Crystalline Reorganization"). That is, the residence time in a conventional zinc phosphate bath must generally be longer than about 600 seconds.

Figure 1:
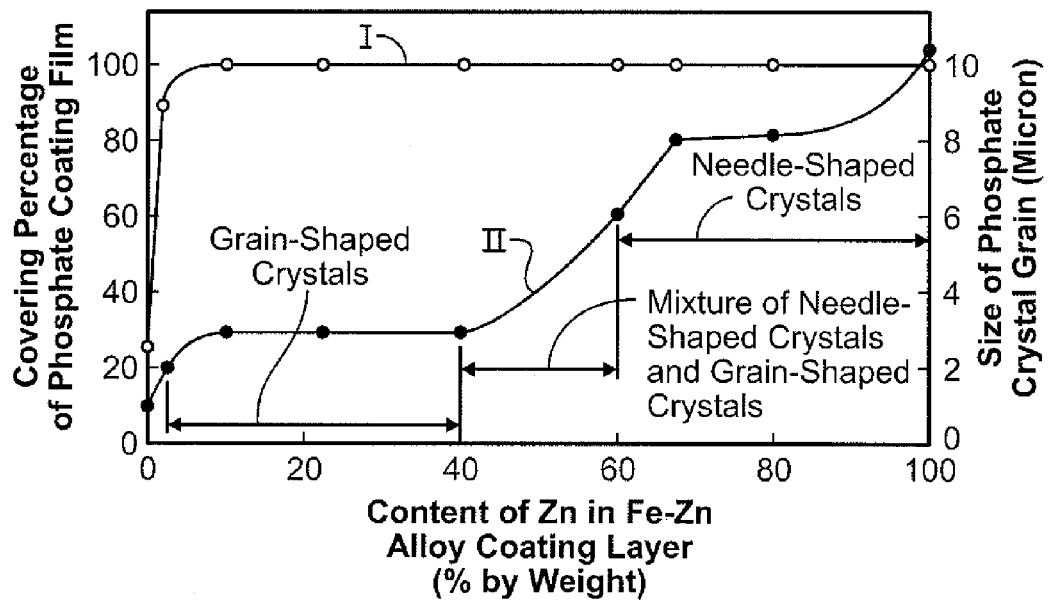
FIG. 1 is chart showing the types of mineral crystals formed in a zinc phosphate coating on galvanized steel, as taught in U.S. Pat. No. 4,510,209.

It is believed by the inventor of the current invention that the "C" zone in FIG. 3 ("Crystallization and Growth") corresponds generally to the middle zone of Curve II in FIG. 1, where a "Mixture of Needle Shaped Crystals and Grain Shaped Crystals" (that is, Hopeite and Phosphophyllite crystals, respectively) are formed.

It is believed by the inventor of the current invention that the "D" zone in FIG. 3 ("Crystalline Reorganization") corresponds generally to the right-hand zone of Curve II in FIG. 1, where "Needle Shaped Crystals" (that is, Hopeite crystals) are formed.

Generally, for large diameter casing of nominal outer diameter of 9.375" or greater, the maximum P-Ratio will be below 0.8, optimally may be below 0.6, and most optimally may be below 0.4.

Some zinc phosphating systems, notably systems which use only spray application of the phosphating solution, may produce extremely large (for example, 20-50 microns) Hopeite grains. Furthermore, some zinc phosphate systems may also produce highly randomized patterns of Hopeite crystals, especially with a large percentage of the Hopeite crystals arranged normal to the surface of the steel substrate. These extremely large grains of Hopeite and/or Hopeite crystals arranged essentially normal to the steel substrate may, in extreme cases, act to "prop open" the metal-to-metal seal surfaces, particularly if there is insufficient interference built into the seal at make-up. For this reason, some zinc phosphating systems may require that a maximum Hopeite grain size be established for particular threaded connections, in addition to the maximum P-Ratio required to insure against galling of the seal surfaces.

If the particular zinc phosphate system in use can not yield a low enough P-ratio without exceeding the maximum Hopeite grain size to prevent or reduce galling, then either the connection or the system must be changed.

Maximum P-Ratio for a particular threaded connection can be determined with a modicum of experimentation and reference to the following variables.

As the nominal pipe diameter increases, the maximum P-Ratio decreases, because the circumferential length of one thread pitch increases, which means that the length of the sliding contact between the seals will increase during the make-and break cycle.

As the thread pitch of the threaded connection increases (that is, there are more threads per inch), the maximum P-Ratio decreases, as the metal seals will remain in contact for more rotations during the make-and-break cycle.

As the seal angle of a metal-to-metal seal decreases, the maximum P-Ratio decreases, as the seal surfaces will be in contact for more rotations during the make-and-break cycle.

As the interference of the metal-to-metal seal at make-up increases, the maximum P-Ratio decreases, as the seal surfaces will be in contact for more rotations during the make-and-break cycle.

For a given threaded connection with a particular well-characterized and repeatable phosphate coating (that is, with a given coating thickness, P-Ratio, and surface crystal morphology) there may exist an optimum particle size and distribution for the particles in the thread compound used for make-up of the threaded connections.

Specifically, if the P-Ratio of the phosphate coating on a particular connection is very low (for example, below 0.4), the Hopeite crystals will be significantly larger and coarser than in a conventional zinc phosphate coating, which means that the interstices between the crystals will also be larger and more numerous. For example, coatings useful with embodiments of the current invention might contain larger hopeite crystals than usual, say within the range of 50-100 microns.

Alternatively, if the morphology of the Hopeite crystals on the surface of the zinc phosphate coating is also very highly random (as might be expected if a spray phosphate system is used), a thread compound for such an embodiment of the current invention might contain a broader distribution of particles that is conventionally used in thread compounds; for example, a particle distribution like that taught in U.S. Pat. No. 3,935,114 (Donaho) for journal bearing grease, in which a complete range of particle sizes, some fine and some coarse, affords better lubrication properties than classified, relatively uniform particle sizes of less than 10 microns, or even less than 2 microns, as taught by prior art thread compounds.

It is not clear at the present time why a high percentage of Hopeite in a zinc phosphate coating yields better resistance to galling in certain threaded connections for oilfield tubular goods. Some possibilities may include the fact that Hopeite is a better substrate for thread lubricant because of the large number of interstices between the Hopeite crystals, or that the slightly higher hardness of the Hopeite crystals contribute to anti-galling properties, or that on the microscopic level there is reduced surface area contact at the metal-to-metal seal surface due to the randomness of the Hopeite crystal distribution and the needle-like shape of the crystals.

Furthermore, it is also contemplated that the better gall resistance may result from solids of the pipe dope being trapped within the interstices of the Hopeite crystals. The interstices may be a particular size and depth, and the solid particles of the pipe dope may have a particle size or mesh size which allows them to be trapped within the interstices. For various solid particles, which may include solid particles such as lead, zinc, copper, PTFE, and graphite, a different Hopeite grain size and coarseness may be result in an improved gall resistance. It is further contemplated that the Hopeite crystals may have a distribution of interstice sizes and depths and that the solid particles of the pipe dope may have a distribution of particle sizes.

It should also be understood that a threaded connection according to embodiments of the present invention may also be formed by other techniques other than those specifically described for controlling the P-Ratio of a zinc phosphate coating. Additionally, a particular phosphate system and desired P-Ratio may yield a particular "interstices pattern" in the Hopeite formation. The interstices formed may also have peaks and valleys. The ratio of the percentage of the surface represented by "peaks" of the Hopeite to the percentage represented by "valleys" may be defined as an "interstices ratio." The interstices ratio may be measured after a make-and-break, so that the Hopeite has been "ironed" during the make-up process. Those having ordinary skill in the art will recognize that a number of techniques may be used to measure this ratio.

In an alternative embodiment, methods and techniques in accordance with the present invention may be used in so-called "dopeless" threaded connections. In these embodiments, the phosphating treatment may be used to treat the connection to provide sufficient strength to allow the connection to survive multiple "make and break" cycles without the addition of pipe dope. In certain embodiments, low P-Ratio phosphating may be a useful undercoating for any dopeless system, but may be particularly useful for a dopeless system which uses a particulate lubricant suspended in some sort of binder over the phosphate coating.

Prior art dopeless systems are disclosed, for example, in US20030144158A1: Threaded component for seizure-resistant tubular threaded joint, which concerns a threaded component for a seizure-resistant tubular threaded joint wherein a lubricating substance is deposited in a thin film on at least the surface of the threads of the threading, said surface being treated to adsorb said lubricating substance. The lubricating substance consists of a homogeneous mixture of a) a thickening agent; b) a set of extreme-pressure additives physically and chemically compatible with the thickening agent and comprising at least an extreme-pressure additive with chemical action called chemical EP additive and capable of being used at Hertz pressures not less than 1000 Mpa's; c) an oil. The proportions of the constituents of the lubricating substance are selected such that said lubricating substance has a consistency capable of ensuring a self-induced and film-forming lubricating process.

US20040113423A1 also discloses one such system. In that application, a threaded pipe for oil extraction industry has a threaded end portion with treated surface in which the metal surface has a roughness (Ra) comprised of 2.0 μm and 6.0 μm, which is covered by a uniform layer (7) of a dry corrosion inhibiting coating and a second uniform layer (8) of dry lubricant coating. Alternatively the layers (8, 9) combined into one uniform layer (9) of a dry corrosion inhibiting coating containing a dispersion of particles of solid lubricant.

U.S. Pat. No. 6,827,996 also discloses one such system. That patent relates to a threaded joint for steel pipes which comprises a pin and a box each having a contact surface including a threaded portion and an unthreaded metal contact portion and which can be prevented from galling during repeated fastening and loosening without application of a compound grease. A solid lubricant coating which comprises a lubricating powder such as molybdenum disulfide and a resin binder is formed on the contact surface of at least one of the pin and the box. The solid lubricant coating has a hardness of 70-140 on the Rockwell M scale and an adhesive strength of at least 500 N/m as determined by the SAICAS (Surface And Interfacial Cutting Analysis System) method, and it exhibits excellent galling resistance even in the environment of high-temperature oil wells. Inclusion of ultraviolet screening fine particles such as titanium oxide fine particles in the solid lubricant coating increases the rust preventing properties of the threaded joint. All of these patents and applications are expressly incorporated by reference in their entirety.

In certain embodiments of the present invention, the connection may be preheated prior to being placed into the phosphating bath. Often, the dipping temperatures required are on the order of 200° F. Obviously, some period of time is required to bring the steel up to temperature, so by preheating the connection some treatment time may be reduced.

In other embodiments, multiple phosphating treatments may be done in order to create multiple layers. The treatments may involve multiple baths (i.e., agitated and quiescent), multiple dipping times, etc. In one embodiment, techniques known in the art are used in a first dipping treatment to create a hard, dense phosphophyllite layer, followed by polishing (to remove free iron), followed by a secondary treatment to form a Hopeite layer.

Further, while embodiments of the present invention reference specific types of phosphating treatments (i.e., dipping, spraying), those having ordinary skill in the art will appreciate that the concepts covered by the present invention are significantly broader than any particular phosphate treatment method. Thus, it is expressly within the scope of the present invention that any manner of phosphating may be used.

Advantages of the embodiments of the invention may include one or more of the following. The threaded connection having a zinc-phosphate coating according to some embodiments of the present invention may have improved gall resistance. Furthermore, a threaded connection may survive multiple make-and-break cycles.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A threaded connection for oilfield tubulars, comprising:
   a metal-to-metal seal, wherein the metal-to-metal seal has a diametral interference at a prescribed make-up between 0.0025" and 0.0045" per inch of nominal diameter of the oilfield tubulars; and
   a zinc phosphate coating, wherein the zinc phosphate coating comprises particles having an average particle size of at least about 50 microns.

2. The threaded connection of claim 1, wherein the metal-to-metal seal has a seal angle of less than 10 degrees.

3. The threaded connection of claim 1, wherein the threaded connection has a thread pitch between 2 threads per inch and 6 threads per inch.

4. The threaded connection of claim 1, wherein the oilfield tubulars have a nominal diameter of equal to or greater than 9.375".

5. The threaded connection of claim 1, wherein the zinc phosphate coating has a P-Ratio less than or equal to 0.6.

6. The threaded connection of claim 1, wherein the zinc phosphate coating has a P-Ratio less than or equal to 0.4.

7. The threaded connection of claim 1, wherein the average particle size ranges from about 50 to 100 microns.

* * * * *